Aug. 26, 1958     A. F. PITYO     2,848,793
METHOD OF PRODUCING DIODES, RESISTORS, RECTIFIERS
OR THE LIKE, OR THE CASTINGS
THEREOF, AND THE PRODUCTS
Filed April 28, 1955

INVENTOR
ALBERT F. PITYO

BY *[signature]*

ATTORNEY

United States Patent Office 2,848,793
Patented Aug. 26, 1958

2,848,793

METHOD OF PRODUCING DIODES, RESISTORS, RECTIFIERS OR THE LIKE, OR THE CASTINGS THEREOF, AND THE PRODUCTS

Albert F. Pityo, Cedar Grove, N. J.

Application April 28, 1955, Serial No. 504,541

1 Claim. (Cl. 29—155.5)

My invention relates to a method of producing diodes, resistors and rectifiers, or the casings thereof, and to the products.

An important object of the invention is to provide a method of the above-mentioned character for welding together the casing sections, and producing the minimum heat within the casing, so that the germanium electrode or junction wire or whisker wire will not be heated sufficiently to change their electrical characteristics.

A further object of the invention is to provide a method of the above-mentioned character which will permit of the welding of the casing sections, without melting or injuring the thermoplastic filling of the end casing section.

A further object of the invention is to provide a method of the above-mentioned character which will afford contacting parts to be butt welded, such contacting parts being of substantially the same cross sectional area so that they have substantially the same electrical resistance so that both contacting parts will melt to substantially the same degree in effecting an easy and proper weld.

A further object of the invention is to provide a method for forming a surrounding flange upon one casing section, having an end which is arranged in butt relation to the end of the other casing section, for butt welding.

A further object of the invention is to provide a casing for devices of the above-mentioned character, which casing is of simplified construction, presents a substantially continuous surface, and the parts of which may be formed by stamping.

Other objects and advantages of the invention will be apparent during the course of the following description.

Figure 1:
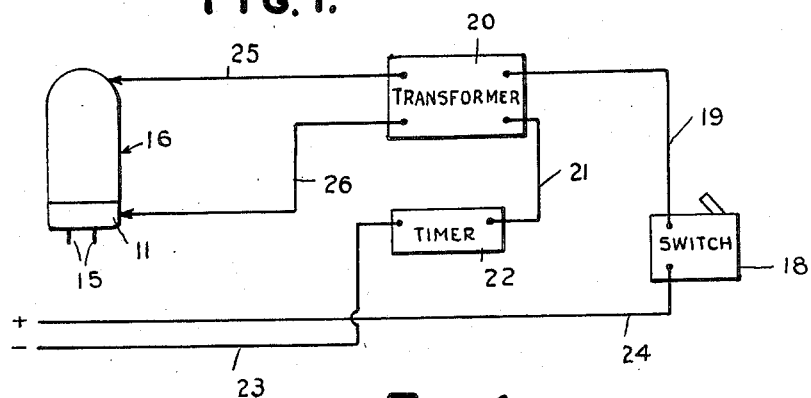
Figure 2:
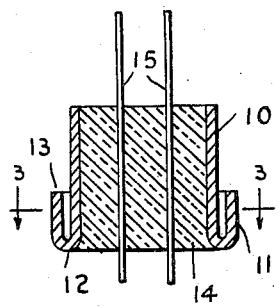
Figure 4:
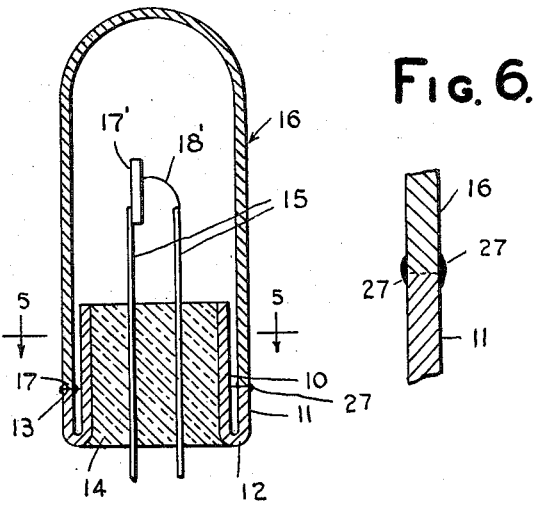
Figure 6:
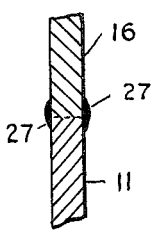
Figure 3:
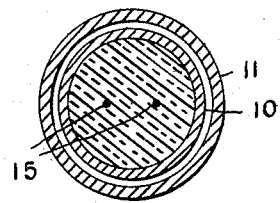
Figure 5:
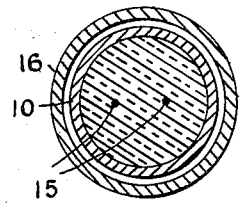

In the accompanying drawings forming a part of this application and in which like numerals are employed to designate like parts throughout same, Figure 1 is a side elevation of a casing embodying my invention and a diagrammatic view of the welding circuit, Figure 2 is a central vertical longitudinal section through the end sleeve or casing section, Figure 3 is a horizontal section taken on line 3—3 of Figure 2, Figure 4 is a central vertical longitudinal section taken through the completed device, parts in elevation, Figure 5 is a horizontal section taken on line 5—5 of Figure 4, and Figure 6 is an enlarged vertical section through the welded joint between the casing sections.

In accordance with my method, an end sleeve or casing section 10 is provided, which is preferably cylindrical and is open at both ends. This casing section is formed of metal, or a metal alloy, and I preferably form the same of the metal material known as "Kovar." This metal material is sold under the trademark or name "Kovar" and this "Kovar" material is made and sold by Westinghouse Electric and Manufacturing Company, 700 Braddock Ave., East Pittsburgh, Pennsylvania. This end casing section or sleeve has one end thereof spun or stamped for producing an annular flange 11, integral with the end of the casing or sleeve, with a rounded shoulder 12 connecting them. The flange 11 is preferably slightly spaced from the casing section or sleeve 10, providing an air gap, as shown. The flange 11 has a butt end 13, the face of which is at right angles to the longitudinal axis of the casing section or sleeve 10.

The casing section or sleeve 10 is filled with insulating material, which may be thermoplastic, such as glass or the like. Embedded in the insulating material 14 are lead wires 15, formed of metal, or metal alloys. I may use the metal material known as "Dumet." This metal material is placed on the market under the trademark "Dumet" and is manufactured and sold by Nesor Alloy Products Co., 283 Halsey St., Newark, N. J.

The lead wires are first introduced into the casing section or sleeve 10 and the insulating material 14, in the plastic state, is introduced into the casing sections or sleeve 10 and embeds the lead wires 15 therein. This insulating material adheres to the lead wires and the casing section and forms with the lead wires and casing sections a vacuum-tight joint.

The numeral 16 designates a main casing section, which is generally cup-shaped and may be formed by stamping or spinning. This casing section may be formed of metal, such as nickle, steel, or a suitable metal alloy such as "Kovar." The casing section 16 may be formed of any metal or metal alloy which is weldable to the metal or alloy of which the casing section or sleeve is formed, which may be "Kovar." The main casing section, end casing section 10 and flange 11 are circular in cross section and the side or periphery of the casing section 16 is of the same internal and external diameter as the flange 11. The elements 16, 10 and 11 are also concentric. The upper end, Figure 4, of the casing section is closed and its lower end is open, forming a butt shoulder 17, the face of which is at right angles to the longitudinal axis of the casing section 16. The butt shoulder 17 is preferably of the same radial dimension as the butt shoulder 13, so that these butt shoulders offer substantially the same electrical resistance to the current passing through them, and will be heated to substantially the same degree, during the welding step.

When the device is a resistor, a germanium electrode 17', or an electrode germanium-plated is attached to the lead wire 15, and a junction wire or whisker wire 18' contacts with the electrode 17' and is attached to the other lead wire 15.

In the practice of the method, the end casing section or sleeve 10 having the lead wires 15 and associated elements applied thereto is moved into the open end of the casing section 16, and the butt shoulder 13 of the flange 11 is brought into engagement with butt shoulder 17. The end casing section 10 is preferably slightly spaced from the casing section 16 and the flange 11. The lead wires 15 and electrode 17' and junction wire 18' are also within the casing section 16. The casing section 16 and flange 11 are held in concentric relation, and the butt shoulders 13 and 17 contact. Pressure is now applied to the casing section 16 and flange 11 in a longitudinal direction to force the butt shoulders 13 and 17 into firm engagement and this pressure is yielding and will follow through during the welding step. The welding circuit is now closed while the parts are thus held pressed together and the welding circuit is closed by operating a switch 18, one terminal of which is connected with the wire 19 leading to one terminal of the primary coil of a transformer 20. The other terminal of this transformer is connected with a wire 21 connected with one terminal of a timer 22, the other terminal of which is connected with a wire 23 leading to one pole of the source of current. The switch 18 has its other pole connected with a wire 24 which leads to the other terminal of the source.

of current. It is thus seen that the circuit will be closed for energizing the primary winding of the transformer 20 and this primary winding energizes the secondary winding of the transformer. One pole of this secondary winding is connected with a wire 25, electrically connected with the casing section 16, and the other pole of the transformer is connected with the wire 26, electrically connected with the flange 11. When the welding circuit is closed through the timer 22, the welding current is supplied to the butt shoulders 13 and 17, for the selected time interval, and the butt shoulders are suitably pressed together, and these butt shoulders are welded, and a little of the molten metal may run to the outer and inner faces of the flange 11 and casing section 13, as more clearly shown at 27, in Figure 6. Since the butt shoulders 13 and 17 are of substantially the same area, they offer substantially the same resistance to the welding current, and these two butt shoulders are slightly melted to substantially the same extent.

By using the butt shoulders 13 and 17, in the welding step, the welding is effected easily and quickly, without excessive heat, which frequently occurs when the butt shoulder of a casing section is welded to a flat wide flange of a companion casing section. Since the butt shoulders 13 and 17 are arranged exteriorly of the casing section 10 and spaced from the inner end of the casing section 10 and the electrode 17' and associated elements, the interior of the casing section 16 is not heated to a high temperature, which would change the electrical characteristics of the electrode 17' and associated elements. The most desirable condition is to retain the temperature within the casing section 16 under 100° C., which is accomplished by my method. The arrangement of the welding joint also prevents the heat from plasticizing the insulating material 14.

Having thus described my invention, I claim:

A method of forming diodes, resistors, rectifiers or the like, comprising taking a cylindrical elongated casing section formed of metallic material and having one end closed and its opposite end open and provided at the open end with a butt shoulder, taking an elongated companion cylindrical casing section formed of metallic material and of smaller exterior diameter than the interior diameter of the first-named casing section and having an elongated cylindrical flange of metallic material formed upon its outer end and arranged exteriorly of and spaced from the companion casing section and having the longitudinal axis of the flange extending longitudinally of the longitudinal axis of the companion casing section and the flange having the same diameter as the first-named cylindrical elongated casing section, said flange having a butt shoulder at its inner end and the inner end of the flange being spaced from the inner end of the companion casing section, introducing insulating material into the companion casing section, embedding lead wires in the insulating material and extending them beyond the inner and outer ends of the insulating material, mounting an electrical device upon the inner ends of the lead wires which electrical device would be injured by excessive heat, introducing the inner end of the companion casing section into the open end of the first-named casing section and bringing the butt end of the flange into contact with the butt end of the first-named casing section, the inner portion of the companion casing section forming a surrounding air space between it and the first-named casing section and the flange forming a surrounding air space with the companion casing section and causing the air spaces to register, pressing the butt shoulders together, and electrically welding the butt shoulders together, the method being such that the heat within the first-named casing section caused by the electrical welding is maintained below the point which would be injurious to the electrical device.

References Cited in the file of this patent

UNITED STATES PATENTS

| | | |
|---|---|---|
| 1,790,787 | Badger | Feb. 3, 1931 |
| 2,109,274 | Niclassen | Feb. 22, 1938 |
| 2,162,477 | Cox | June 13, 1939 |
| 2,200,694 | Gerecke | May 14, 1940 |
| 2,205,502 | Tromp | June 25, 1940 |
| 2,278,392 | Murphy | Mar. 31, 1942 |
| 2,404,113 | Wagner | July 16, 1946 |
| 2,611,793 | Simpson | Sept. 23, 1952 |